Nov. 24, 1964        J. B. ROES        3,158,750
ENERGY STORAGE DEVICE
Filed Feb. 10, 1961        2 Sheets-Sheet 1
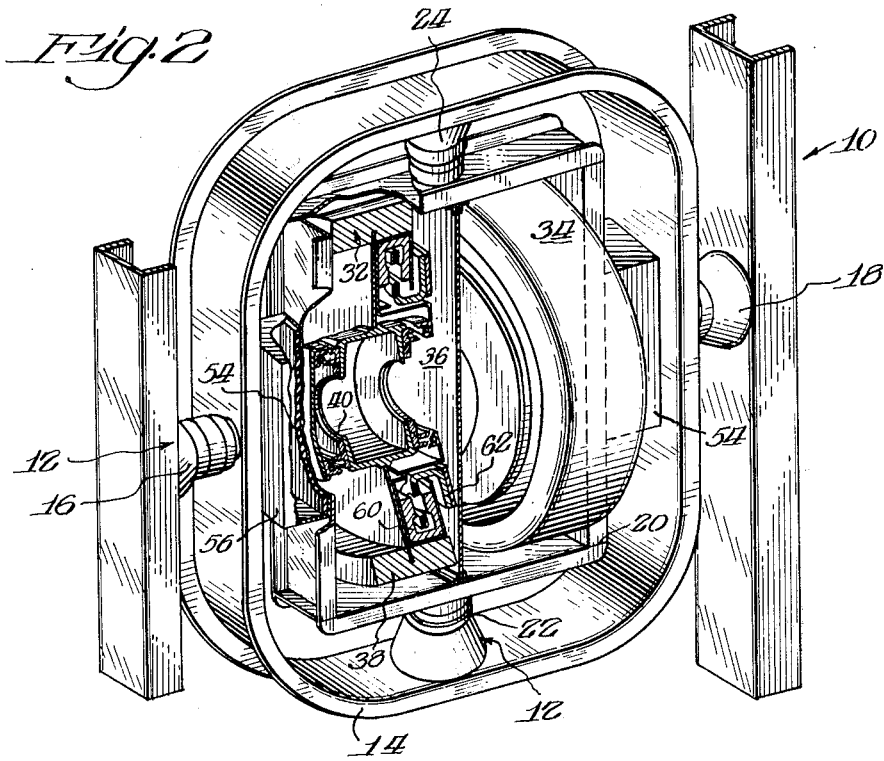

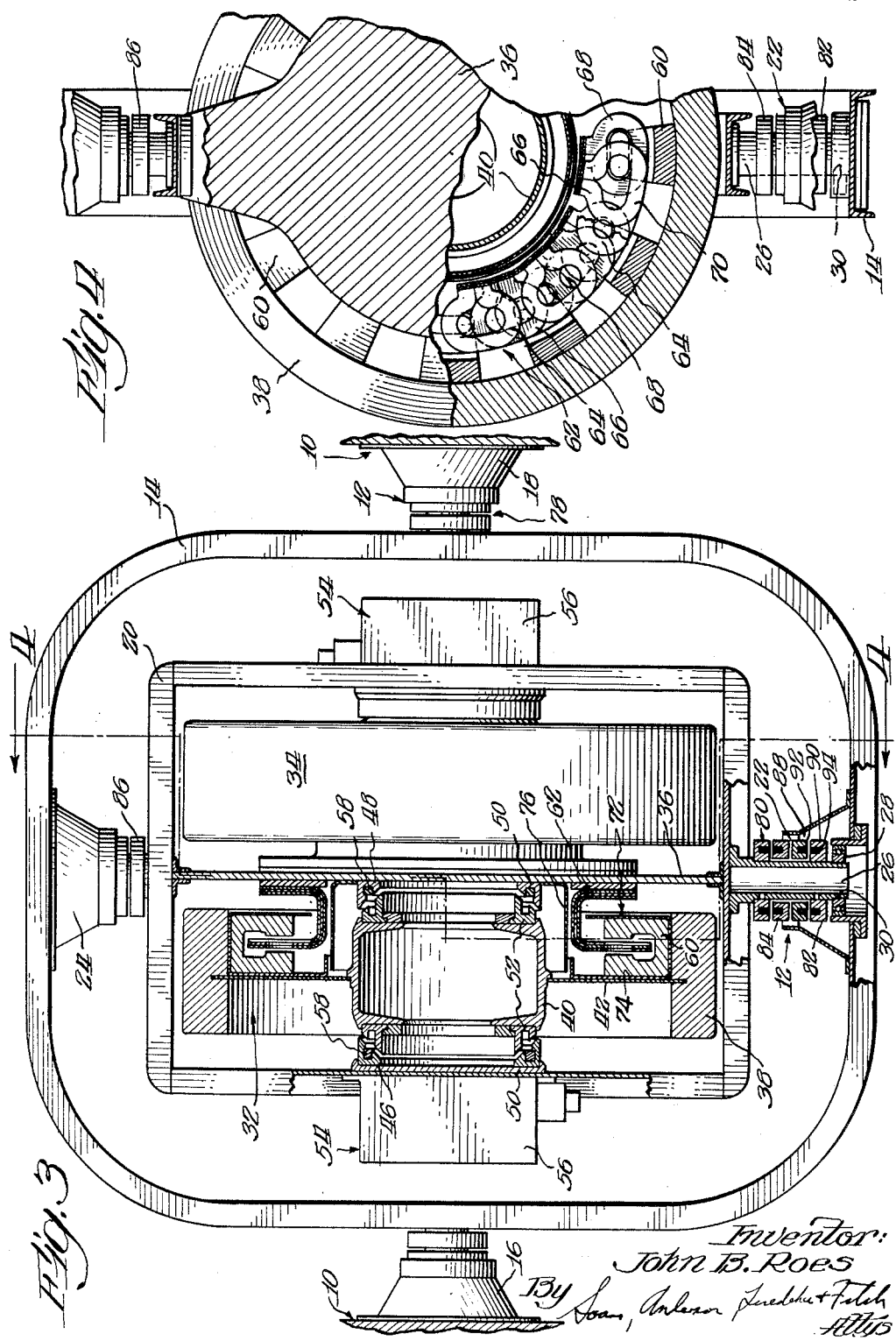

United States Patent Office 3,158,750
Patented Nov. 24, 1964

3,158,750
ENERGY STORAGE DEVICE
John B. Roes, San Diego, Calif., assignor to General Dynamics Corporation, New York, N.Y., a corporation of Delaware
Filed Feb. 10, 1961, Ser. No. 88,515
4 Claims. (Cl. 307—84)

The present invention relates to energy storage devices and more particularly to an energy storage device which stores energy mechanically.

Portable electrical power sources are being used in increasing numbers for a variety of applications both on the ground and in outer space. One of the most promising sources of energy, especially in outer space, is solar power. Solar power is free and inexhaustible, and a solar power source has a long life and a high energy-to-weight ratio. However, one of the disadvantages of a solar power source is that it requires an energy storage device for continuous operation. Also, with solar power sources, as well as with certain other sources of power, an energy storage device may be employed to supplement the source during peak loads.

In previously available power sources, chemical batteries have been employed to store electrical energy. Such storage devices have certain disadvantages such as an extremely high weight-to-energy ratio, a sensitivity to ambient temperature and gravitational effects.

An object of the present invention is the provision of an improved energy storage means. Another object of the invention is the provision of a storage device which stores energy mechanically. Still another object is the provision of an energy storage device which is particularly adapted for use in an outer space environment. A further object is the provision of an energy storage device which employs a pair of magnetically suspended flywheels to store energy. A further object is the provision of an energy storage device which is efficient in operation and durable in use.

Other objects and advantages of the present invention will become apparent by reference to the following description and accompanying drawings.

In the drawings:

FIGURE 1 is a block diagram of a solar power system incorporating an energy storage device in accordance with the present invention;

FIGURE 2 is a perspective view of an energy storage device in accordance with the present invention, portions thereof being broken away to show certain features thereof;

FIGURE 3 is an enlarged vertical cross-sectional view, partly in elevation, of the energy storage device shown in FIGURE 2;

FIGURE 4 is a fragmentary cross-sectional view taken generally along line 4—4 of FIGURE 3, with parts thereof being removed to show certain features thereof; and FIGURE 5 is a schematic circuit diagram of a synchronous inverter which may be employed with the solar power system shown in FIGURE 1.

In general, an energy storage device in accordance with the present invention, includes a frame and a rotor which is rotatably supported on the frame. The rotor carries a means for establishing a magnetic field, and the frame carries a synchronous armature winding, which is disposed so as to intersect the magnetic field and cause torque to be applied to the rotor when alternating current is passed therethrough.

Coupling means are provided for connecting the armature winding to a supply of alternating current under a first set of conditions and to a means for receiving alternating current therefrom under a second set of conditions.

For purposes of explanation, an energy storage device is described hereinafter which is particularly adapted to be employed in an outer space environment. The energy storage device may be employed in a solar power system such as that shown in FIGURE 1. In the illustrated power system, solar energy is converted into electrical energy by a solar generator, which may include thermoelectric elements, silicon solar cells, etc. During the period when solar energy impinges on the solar generator, the solar generator provides a direct current, which current is applied to a synchronous static inverter that converts the direct current into three-phase alternating current.

The alternating current from the synchronous inverter is coupled to the energy storage device, which converts the electrical energy into mechanical energy and stores the same. The direct current from the solar generator is also coupled to an output circuit which may include a static inverter which converts the direct current into alternating current of a predetermined frequency and amplitude. During peak loads or non-productive periods (i.e., when the solar generator ceases to supply sufficient direct current to the output circuit), direct current is supplied to the output circuit by the energy storage device which is coupled thereto through a rectifier.

As illustrated particularly in FIGURES 2 and 3, the energy storage device is mounted to a supporting structure 10, which may be a part of a space vehicle, by a gimbal system 12. The gimbal system 12 permits the vehicle carrying the energy storage device to change orientation without changing the orientation of the energy storage device. The gimbal system 12 in the illustrated embodiment includes an outer generally rectangular gimbal frame 14 which is supported in the supporting structure 10 by a pair of oppositely directed, coaxially extending outer bearings 16 and 18.

A generally rectangular inner gimbal frame 20 is supported in the outer gimbal frame 14 by a pair of co-axially disposed, oppositely directed inner bearings 22 and 24, the axis of which is at a right angle to the axis of the outer bearings 16 and 18. Each of the illustrated bearings includes a hollow shaft 26, one end of which is suitably connected to the inner gimbal frame 20 or to the supporting structure 10, as the case may be, and the other end of which is journalled in a ball bearing 28. The ball bearing 28 is suitably carried by the outer gimbal frame 14. A shoulder 30 on the shaft 26 limits axial movement of the shaft 26.

Energy is stored in the energy storage device by means of pair of counter-rotating magnetically suspended, co-axial rotors or flywheels 32 and 34. One of the rotors 32 is disposed on one side of a transversely extending center plate 36 which is connected to the inner frame 20, and the other rotor 34 is disposed on the other side of the plate 36. The rotors 32 and 34 are similarly constructed except that one of the rotors is the mirror image of the other. Therefore, to facilitate the explanation, the construction of only one rotor (the left hand rotor in FIGURES 2 and 3) is described hereinafter.

Each of the rotors in the illustrated embodiment includes a ring or rim 38 which is connected to a generally tubular rotor shaft 40 by means of a transversely extending plate 42. The elements of the rotor 32 are made of a material which has sufficient tensile strength to withstand the angular velocity of the rotor 32 and, in order to store the maximum energy in the rotor 32, the rotor is preferably made of a material having a high ratio of tensile strength to density. The ring 38 may, for example, be made of wound glass fiber, and the remaining elements of the rotor 32 may be made of beryllium, titanium alloy (13%-wt. vanadium, 11%-wt. chromium, 5%-wt. aluminum and the remainder titanium), etc.

In the illustrated embodiment, the rotor 32 is rotatably suspended in the inner gimbal frame 20 by a magnetic bearing system. The magnetic bearing system includes a pair of magnetic bearings 46 and 48, one of which is disposed at one end of the shaft 40 and the other of which is disposed at the other end of the shaft 40. Each of the magnetic bearings 46 and 48 includes a pair of opposed, spaced apart cores 50 and 52 which are in the form of rings, and have U-shaped cross sections.

The cores are made of a permanent magnetic material, such as ferroxdur type ferrite, etc. The inner cores 52 are suitably mounted to and concentrically with the rotor shaft 40. The outer cores 50 are suitably supported by the inner gimbal frame 20, or by the center plate 36, as the case may be. The poles of each pair of cores 50 and 52 are arranged so that an attractive force exists therebetween. The opposed faces of the cores 50 and 52 are in parallel relationship and are cut at an angle, as shown in FIGURE 3, so as to minimize transverse movement of the rotor 32.

In the ilustrated embodiment, means is provided in the magnetic bearing system for maintaining the rotor 32 in such an axial position that the gaps between the cores 50 and 52 are approximately equal. The axial position of the rotor is maintained by controlling the relative strength of magnetic flux in the respective gaps between the cores 50 and 52. If the rotor 32 moves from a central position, the flux in the gap which becomes larger than normal is increased, and the flux in the gap which becomes smaller than normal is decreased by a magnetic bearing control unit 54. The magnetic bearing control unit 54 is mounted in a housing 56 supported on the side of the inner gimbal frame.

The flux in the respective gaps is varied by a concentric coil or control winding 58 disposed in the recess provided in the respective outer cores 50. Variation in D.-C. current through the respective windings 58 correspondingly varies the flux in the associated gaps. The D.-C. current is varied by the control unit 54 which includes suitable circuit means, (not shown) such as a conventional bridge circuit and transistor amplifier, for measuring the inductance of one of the control windings 58, and for varying the current through both windings 58 in accordance with the measured inductance. In this connection, as the gap becomes smaller, the inductance of the winding 58 associated with that gap increases. This increase in inductance is measured by the circuit means, and the circuit means decreases the current through that winding and increases the current through the other winding.

Electrical energy supplied to the storage device is converted into mechanical energy in the form of torque which is applied to the rotor 32, and mechanical energy stored in the rotor as inertia is converted back into electrical energy by a magnetic field-synchronous armature winding arrangement. In the illustrated embodiment, the magnetic field is provided by a series of equally spaced, generally U-shaped permanent magnets 60 suitably carried on the inner surface of the ring 38, with the gaps in the permanent magnets 60 being directed toward the axis of the rotor 32 and with the pole faces of the permanent magnets 60 lying in the same transverse planes. The direction of the magnetic fields in the gaps of successive magnets is alternated to provide a changing field through the armature winding 62. The permanent magnets 60 are made of a suitable permanet magnet material, such as ferroxdur type ferrites.

The synchronous armature winding 62 is in the form of a ring which is generally U-shaped in cross section. One of the legs of the ring 62 is suitably connected to the center plate 36 and the other leg thereof is disposed in a transverse plane extending through the gaps in the permanent magnets 60. In the illustrated embodiment the armature winding 62 includes three separate windings 64, 66 and 68, one for each phase, which are suitably held together.

Each of the phase windings 64, 66 and 68 includes a series of equally spaced apart, generally elliptical, air core-pancake type coils 70, the same number of coils 70 being provided as permanent magnets 60. Successive coils are wound in opposite directions to correspond with the alternately directed magnetic fields. As shown in FIGURE 4, the coils 70 are disposed in the leg of the armature winding 62 which is disposed in the gaps, and the core of each of the coils 70 is dimensioned so as to be slightly larger in cross section than the pole faces of the respective permanent magnets 60. In this connection, the pole faces of the respective magnets 60 are made generally elliptical in outline to thereby approximate the shape of the core. In this way, one side of the coil 70 has passed beyond the gap when the other side of the same is entering the gap.

The coils 70 of the three phase windings 64, 66 and 68 are displaced circumferentially by 120 electrical degrees with respect to each other. To minimize losses in the magnetic fields provided by the permanent magnets 60, a magnetic shield 72 is provided which substantially encloses the magnets 60 and the armature winding 62. As shown in FIGURE 3, the shield 72 includes a generally U-shaped ring member 74 disposed around the permanent magnets 60, and a concentric tubular member 76 which is connected to the center plate 36 and is disposed over the armature winding 62. The shield 72 may be made of a high permeability material such as mu-metal, etc.

The armature windings 62 of the two rotors 32 and 34 are connected so that the rotors 32 and 34 rotate in opposite directions. In this way, no net angular momentum results in the storage device. Electrical power for the magnetic bearing control unit 54 may be obtained from one of the phase windings.

Electrical energy is transmitted from the support structure 10 to the outer gimbal frame 14 and from the outer gimbal frame 14 to the inner gimbal frame 20 by two sets of rotary transformers 78 and 80. In the illustrated embodiment, each set of rotary transformers 78 and 80 includes three transformers 82, 84 and 86, one for each phase. The transformers 82, 84 and 86 are in the form of rings and the transformers 82 and 84 for two of the phases are mounted concentrically on one bearing 16 or 22, as the case may be, and the transformer 86 for the third phase is mounted concentrically on the opposite bearing 18 or 24, as the case may be.

The transformers 82, 84 and 86 are similar in construction and to facilitate the explanation only one is described hereinafter. As shown in FIGURE 3, the transformer 82 includes a pair of opposed U-shaped cores 88 and 90, one of which is fixedly mounted to the shaft 26 of the bearing and the other of which is fixedly supported by the outer frame 14. The windings 92 and 94 of the transformer 82 are disposed in the respective recesses provided by the U-shaped cores 88 and 90. The transformer cores 88 and 90 may be made of a suitable ferromagnetic material such as ferrox-cube type ferrite, etc., and for maximum efficiency, a minimum gap is preferably maintained between the opposed faces of the cores 88 and 90.

The energy storage device operates as a synchronous motor during conditions wherein energy is being supplied thereto, and operates as a three phase alternator during conditions wherein current is being supplied by the energy storage device.

So that the rotor may be started and increased in speed, means are provided in the inverter, which supplies alternating current to the storage device, for varying the frequency of the current.

This is accomplished in the illustrated embodiment, by controlling the actuation of the inverter. An inverter circuit which may be employed with the described storage device is shown in FIGURE 5. The inverter circuit includes six silicon controlled rectifiers 96, which are connected so as to form three single pole double throw solid state switches, one for each phase. Each of the switches has the same circuit connections, and therefore only one is described hereinafter.

One of the silicon controlled rectifiers 96 is connected to one of the end terminals of the primary winding 98 of the transformer 82, and the other silicon controlled rectifier 96 is connected to the other end terminal of the primary winding 98. One side of the D.C. source (i.e., the solar generator) is connected to the center terminal of the primary winding 98 and the other side of the D.C. source is connected through a secondary winding 100 of a pulse transformer 102 to a common connection to both rectifiers 96. The gates 104 of the controlled rectifiers 96 are connected to an inverter control 106 which provides signals for firing the rectifiers 96 in proper sequence.

The primary 108 of the pulse transformer 102 is connected to the inverter control 106 which provides a turn-off signal to the pulse transformer 102 at the proper time. The pulse transformer 102 is arranged so as to apply a voltage which has a polarity opposite to that of the D.C. source, thereby providing a zero voltage across the controlled rectifiers 96 and cutting off the same.

The inverter control 106 may be of the conventional type normally employed with three phase static inverters. The inverter control 106 may include three pulse generators (not shown) one for each phase, which are synchronized to provide signals to turn-off the silicon controlled rectifiers in the proper sequence, and three bistable multivibrators (not shown) activated, respectively, by the pulse generators after a time delay to provide turn-on signals to the controlled rectifiers, whereby a three phase alternating current is provided at the rotary transformer 78. The operation of the pulse generators is synchronized so as to vary the frequency of the three phase alternating current, and thereby provide a means for starting up the rotors, increasing their speed to a predetermined maximum speed and then maintaining the rotors at the maximum speed.

To start-up the rotors the operation of the pulse generators is synchronized by a low frequency oscillator 110 which is connected thereto for a short time interval. As the rotor begins to rotate the phase angle between the current and voltage in the respective primaries of the rotary transformer 78 decreases. The phase angle of the current in the primary windings 98 of the transformers 82 is determined by connecting a resistor 112 in series with each of the primary windings. The voltages developed across the resistors 112 are coupled respectively to the pulse generators and synchronize the same when the phase angle becomes less than 30 degrees. This continually increases the frequency of the pulse generators which, in turn, increases the frequency of the static inverter, thereby increasing the speed of the rotors.

The maximum speed of the rotors is limited by a second oscillator 114 which is coupled to the pulse generators when the frequency of the static inverter is the same as the second oscillator frequency. The second oscillator then is employed to synchronize the pulse generators and the static inverter is consequently operated at a constant frequency, the voltage and current in the primary windings being approximately in phase. The rotors are thus no longer accelerated.

Under conditions where energy is required from the energy storage device, alternating current is coupled through the rotary transformers 78 and 80 to the rectifier and thence to the output circuit, or inverter.

In one specific embodiment of the storage device each rotor is twenty-four inches in diameter and the ring is made of wound glass fibers and weighs approximately 56.5 lbs. The rotors are rotated in opposite directions at a maximum speed of approximately 19,000 r.p.m. Twelve permanent magnets, made of a ferroxdur ferrite, are mounted against the inside surface of each ring. Each magnet provides approximately 2000 gauss over 1 cm. gap which has a cross section of 20 cm.$^2$. Three turns are provided in each coil and twelve coils are provided in each phase winding. The magnetic bearings are made of ferroxdur and provide an average magnetic intensity of 2500 oersteds.

The bearings are designed to suspend the rotors during a 1 G acceleration and to permit vibrations of $\frac{1}{16}$ in. in amplitude. The device has a storage capacity of approximately 1750 watt-hours and provides a maximum of 3 kilowatts to a load. The energy storage device has an efficiency of approximately 87%.

The above described energy storage device may be employed on earth, but is especially adapted for use in an outer space environment where its reliability and specific weight compare favorably with previously available storage devices. The device employs two counter-rotating, brushless motor alternators which provide a very high storage efficiency. The rotors have the same mass and are rotating in synchronism so therefore no net angular momentum results from the device. The abrasion of surfaces sliding over each other at high speeds is eliminated in the described storage device by using magnetic bearings and inductive coupling rather than brushes.

Various changes and modifications may be made in the above described storage device without deviating from the spirit or scope of the present invention.

Various features of the present invention are set forth in the accompanying claims.

What is claimed is:

1. An energy storage device comprising a frame, a pair of rotors, means on said frame for rotatably supporting said rotors in coaxial relationship, magnetic means carried by each rotor for establishing a series of magnetic fields, a pair of synchronous armature windings on said frame, one of said synchronous armature windings being disposed in the magnetic fields of one of said rotors, and the other of said windings being disposed in the magnetic fields of the other rotor, coupling means connected to said armature windings for supplying alternating current thereto and receiving alternating current therefrom, means connected to said coupling means for supplying alternating current thereto under a first set of conditions and thereby rotating said rotors at an angular velocity determined by the frequency of the alternating current, means coupled to said supplying means and responsive to the angular velocity of said rotors for gradually increasing the frequency when said frequency is below a predetermined maximum, the armature windings being connected so that the rotors rotate in opposite directions, and means connected to said coupling means for receiving alternating current therefrom under a second set of conditions.

2. An energy storage device comprising a frame, a pair of rotors, magnetic means on said frame for suspending said rotors in co-axial relationship, permanent magnets spaced around each rotor, a pair of synchronous three-phase armature windings on said frame, one of said windings being disposed in the fields provided by the permanent magnets on one of said rotors, and the other of said armature windings being disposed in the magnetic fields provided by the permanent magnets on the other rotor, coupling means connected to said armature windings for supplying three phase alternating current thereto and receiving three phase alternating current therefrom, means connected to said coupling means for supplying three-phase alternating current thereto under a first set of conditions and thereby rotating said rotors at an angular velocity determined by the frequency of the alternating current, means coupled to said supplying means and responsive to the angular velocity of said rotors for gradually increasing the frequency when said frequency is below a preselected maximum, the armature windings being connected so that the rotors rotate in opposite directions, and means connected to said coupling means for receiving alternating current therefrom under a second set of conditions.

3. An energy storage device comprising a frame, a gimbal system for supporting said frame in a support structure, a pair of rotors, a pair of magnetic bearings for rotatably suspending each of said rotors, the rotors being suspended in coaxial relationship, each of said bearings including a pair of spaced apart opposed permanent magnet cores which are in the form of rings and have U-shaped cross sections, one of the cores being mounted to and concentrically with the associated rotor, the other core being mounted to the frame, the opposed faces of said pair of cores being cut at an angle, a coil winding disposed in one of said pair of cores, and means responsive to variation in the space between said pair of cores and connected to said coil winding for varying the current in said coil winding to maintain the spacing substantially constant, permanent magnets spaced around each rotor, said permanent magnets providing a series of magnetic fields, a pair of synchronous three phase armature windings on said frame, one of said armature windings being disposed in the magnetic fields provided by the permanent magnets on one of said rotors, and the other armature winding being disposed in the magnetic fields provided by the permanent magnets on the other rotor, means for supplying three-phase alternating current under a first set of conditions, two sets of rotary three-phase transformers connecting said supply means to said armature windings, the armature windings being connected so that the alternating current causes said rotors to rotate in opposite directions at an angular velocity determined by the frequency of the alternating current, means coupled to said supplying means and responsive to the angular velocity of said rotors for gradually increasing the frequency when said frequency is below a preselected maximum, the rotary transformers being mounted on said gimbal system so as to transmit current between the support structure and the frame, and means connected to said transformers for receiving alternating current therefrom under a second set of conditions.

4. An energy storage device comprising an inner frame, an outer frame, a pair of oppositely directed, coaxial bearings between said inner frame and said outer frame, a pair of oppositely directed, coaxial bearings between said outer frame, and a support structure, each of said bearings including a shaft, a pair of rotors, magnetic means on said inner frame for rotatably suspending said rotors in coaxial relationship, a series of U-shaped permanent magnets spaced around each rotor, a pair of synchronous three-phase armature windings on said frame, one of said armature windings being disposed in the gaps of the permanent magnets on one of said rotors, and the other of said armature windings being disposed in the gaps of the permanent magnets on the other rotor, means for supplying three-phase alternating current under a first set of conditions, means for receiving three-phase alternating current under a second set of conditions, and two sets of three-phase, rotary transformers coupling said supplying means and said receiving means to the armature windings, the armature windings being arranged so that the rotors rotate in opposite directions when current is supplied thereto, said rotors operating at an angular velocity determined by the frequency of said alternating current, means coupled to said supplying means and responsive to the angular velocity of said rotors for gradually increasing the frequency of the alternating current when said frequency is below a preselected maximum, one of said transformer sets being mounted concentrically with the shafts included in said first mentioned bearings and the other transformer set being mounted concentrically with the shafts included in the second mentioned bearings.

References Cited in the file of this patent

UNITED STATES PATENTS

| 1,966,940 | Willis | July 17, 1934 |
| 2,193,531 | Esval | Mar. 12, 1940 |
| 2,432,982 | Braddon et al. | Dec. 23, 1947 |
| 2,567,636 | Cuny | Sept. 11, 1951 |
| 2,704,231 | Goldsmith | Mar. 15, 1955 |

FOREIGN PATENTS

| 65,625 | Netherlands | Apr. 15, 1950 |